(12) United States Patent
Baer et al.

(10) Patent No.: US 7,743,487 B2
(45) Date of Patent: Jun. 29, 2010

(54) METHOD TO PLANARIZE PERPENDICULAR WRITE POLES USING A COMBINATION OF CMP AND REACTIVE ION MILLING

(75) Inventors: Amanda Baer, Campbell, CA (US); Hamid Balamane, Palo Alto, CA (US); Michael Feldbaum, San Jose, CA (US); Ming Jiang, San Jose, CA (US); Aron Pentek, San Jose, CA (US); Neil Leslie Robertson, Palo Alto, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1038 days.

(21) Appl. No.: 11/453,681

(22) Filed: Jun. 14, 2006

(65) Prior Publication Data

US 2006/0231523 A1 Oct. 19, 2006

Related U.S. Application Data

(63) Continuation-in-part of application No. 10/836,867, filed on Apr. 30, 2004, now Pat. No. 7,563,381, and a continuation-in-part of application No. 10/792,330, filed on Mar. 2, 2004, now Pat. No. 7,217,666.

(51) Int. Cl.
*G11B 5/127* (2006.01)
*H04R 31/00* (2006.01)

(52) U.S. Cl. ............. 29/603.16; 29/603.07; 29/603.11; 29/603.15; 29/603.18; 216/22; 216/39; 216/41; 216/48; 216/65; 360/121; 360/122; 360/317; 451/5; 451/41

(58) Field of Classification Search ............. 29/603.07, 29/603.11, 603.13–603.16, 603.18; 216/22, 216/39, 41, 48, 65; 360/121, 122, 317; 451/5, 451/41
See application file for complete search history.

(56) References Cited

U.S. PATENT DOCUMENTS

| | | |
|---|---|---|
| 6,694,604 B2 | 2/2004 | Santini |
| 2002/0191350 A1 | 12/2002 | Emilio Santini |
| 2003/0137771 A1* | 7/2003 | Emilio Santini ............ 360/126 |
| 2004/0240110 A1 | 12/2004 | Matono |
| 2004/0257702 A1 | 12/2004 | Kimura et al. |
| 2005/0024771 A1 | 2/2005 | Le |
| 2005/0024779 A1 | 2/2005 | Le et al. |

* cited by examiner

*Primary Examiner*—Paul D Kim
(74) *Attorney, Agent, or Firm*—Maryam Imam; IPxLaw Group LLP

(57) ABSTRACT

A perpendicular write head includes a beveled main pole having corners defining a track width and having a planarized surface and encapsulated on either side thereof and below by an alumina layer, the alumina layer having a polished surface and extending above the main pole on either side thereof as steps.

19 Claims, 5 Drawing Sheets

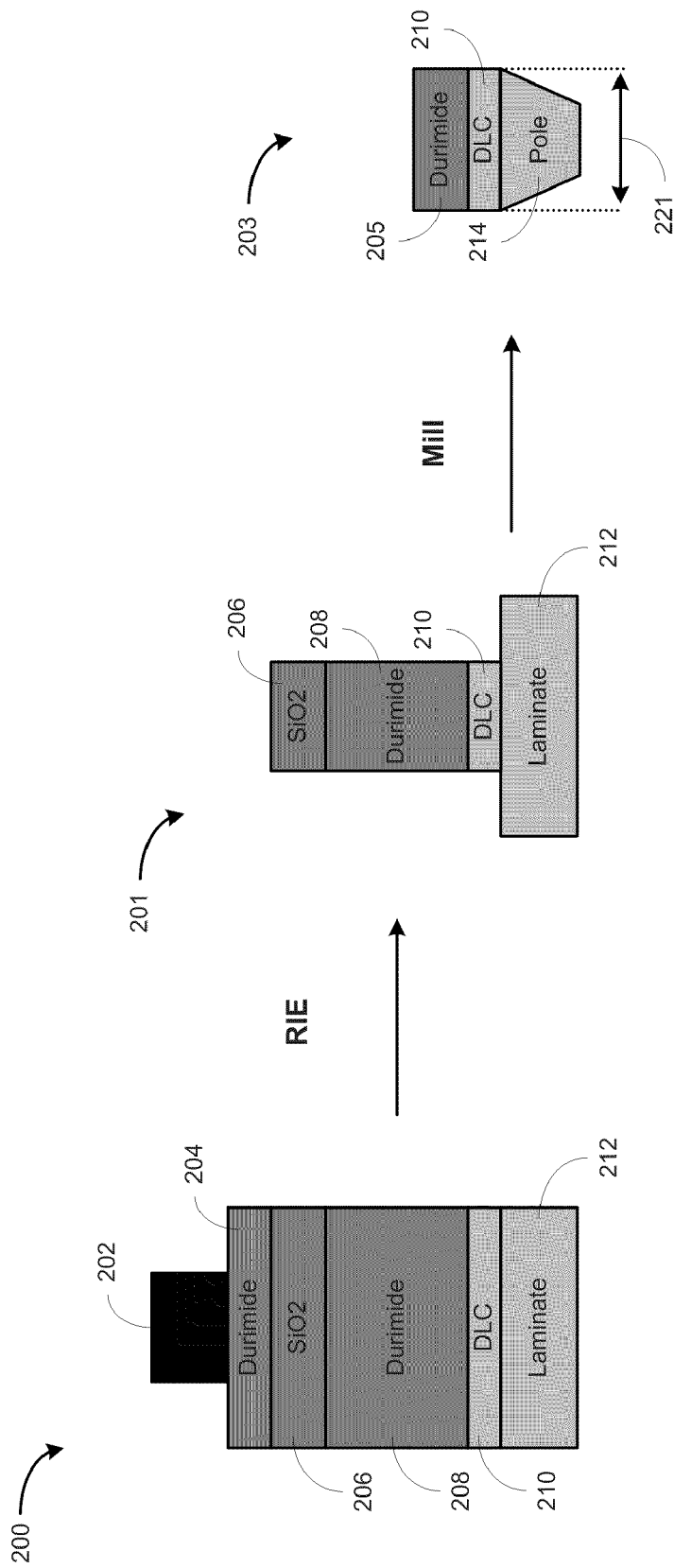

METHOD TO PLANARIZE PERPENDICULAR WRITE POLES USING A COMBINATION OF CMP AND REACTIVE ION MILLING

CROSS REFERENCE TO RELATED APPLICATIONS

This application is a continuation-in-part of our prior U.S. patent application Ser. No. 10/836,867, filed on Apr. 30, 2004, now U.S. Pat. No. 7,563,381, and entitled "High Milling Resistance Write Pole Fabrication for Perpendicular Recording", by Quang Le et al., the contents of which are incorporated herein by reference as though set forth in full and U.S. patent application Ser. No. 10/792,330, filed on Mar. 2, 2004, now U.S. Pat. No. 7,217,666, by Aron Pentek et al., the contents of which are incorporated herein by reference as though set forth.

BACKGROUND OF THE INVENTION

1. Field of the Invention

This invention relates generally to the field of perpendicular magnetic recording (or write) heads and more particularly, to a main pole within the write head being made with a polyimide mask with improved removal thereof to form the main pole and planarized main pole onto which trailing shield is formed to increase head performance.

2. Description of the Prior Art

As the recording density of magnetic hard drives (or disc drives) increases, a physical limitation is experienced using longitudinal recording systems partly due to thermal relaxation known as super-paramagnetism. That is, the density requirements for meeting today's storage needs are simply not attainable with longitudinal recording systems. To provide further insight into this problem, it is anticipated that longitudinal recording systems will lose popularity as storage capacities in excess of about 150 Gigabytes-per-square-inches become a requirement. These and other factors have lead to the development and expected launch of perpendicular recording heads or write heads. Perpendicular recording is promising in pushing the recording density beyond the limit of longitudinal recording.

Accordingly, perpendicular recording potentially supports much higher linear density than longitudinal recording due to lower demagnetizing fields in recorded bits.

A magnetic recording head for perpendicular writing generally includes two portions, a writer portion for writing or programming magnetically-encoded information on a magnetic media or disc and a reader portion for reading or retrieving the stored information from the media.

The writer of the magnetic recording head for perpendicular recording typically includes a main pole and a return pole which are magnetically separated from each other at an air bearing surface (ABS) of the writer by a nonmagnetic gap layer, and which are magnetically connected to each other at a back gap closure (yoke). This structure is a single-pole write head because while a main pole and return pole are referred thereto, the return pole is not physically a pole, rather, it serves to close the loop with the main pole and the soft under layer of the media to form a magnetic flux circuit.

Positioned at least partially between the main and return poles are one or more layers of conductive coils encapsulated by insulation layers. The ABS is the surface of the magnetic head immediately adjacent to the perpendicular medium.

To write data to the magnetic medium, an electrical current is caused to flow through the conductive coil, thereby inducing a magnetic field across the gap between the main and return poles. By reversing the polarity of the current through the coil, the polarity of the data written to the magnetic media is also reversed.

The main and return poles are generally made of a soft magnetic material. The main pole generates magnetic field in the media during recording when the write current is applied to the coil. A magnetic moment of the main pole should be oriented along an easy axis parallel to the ABS when the main pole is in a quiescent state, namely without a write current field from the write coil.

With the advent of perpendicular recording heads, density has been greatly increased, as discussed hereinabove, which has lead to a greater need for accurate recording of data onto the desired track. That is, writing to adjacent tracks is highly undesirable because it causes corruption of data on adjacent tracks.

Perpendicular write heads generally have a trailing shield, side shields, a top pole and a bottom return pole. The main pole is generally shaped in a manner causing a tip or an extension thereof that is narrower than the remaining portion thereof to form a top pole. The side shields act to shield the top pole so as to reduce adverse affects on adjacent tracks during the writing of magnetic transitions (data) at a location on a given track.

In the recording head, namely the slider, the main and return poles are separated by the gap layer, causing writing of data onto tracks. The main pole is generally beveled in shape in an effort to reduce adjacent track writing.

There are problems associated with the formation of the main pole and particularly the top pole in perpendicular heads. Two such problems are now presented. First, to form the main pole, an N-methyl pyrrolidone (NMP) soluble polyimide is used but then removed to form the pole. The polyimide layer is milled prior to its removal and the milling process adds difficulty to the removal of the polyimide layer, as fences or sidewalls remain behind and in the event such fences fall, voids are caused, which adversely affect head performance. Second, the main pole, which includes a top pole, as previously discussed, need be planarized or leveled, at its surface, so as to properly form a trailing shield thereupon.

Thus, in light of the foregoing, there is a need for a perpendicular recording head having a main pole (or write pole) developed in such a way so as to planarize the same for trailing shield formation thereupon and to improve polyimide layer removal during formation of the main pole to improve performance of the head.

SUMMARY OF THE INVENTION

Briefly, one embodiment of the present invention includes a perpendicular write head and a method of manufacturing the same for writing onto high area density tracks of a disc drive. The write head including a beveled main pole having corners defining a track width and having a planarized surface and encapsulated on either side thereof and below by an alumina layer, the alumina layer having a polished surface and extending above the main pole on either side thereof as steps.

IN THE DRAWINGS

FIGS. 3-9 show the relevant steps of manufacturing the main pole 128 in accordance with an embodiment and method of the present invention.

DETAILED DESCRIPTION OF THE PREFERRED EMBODIMENT

Figure 1:
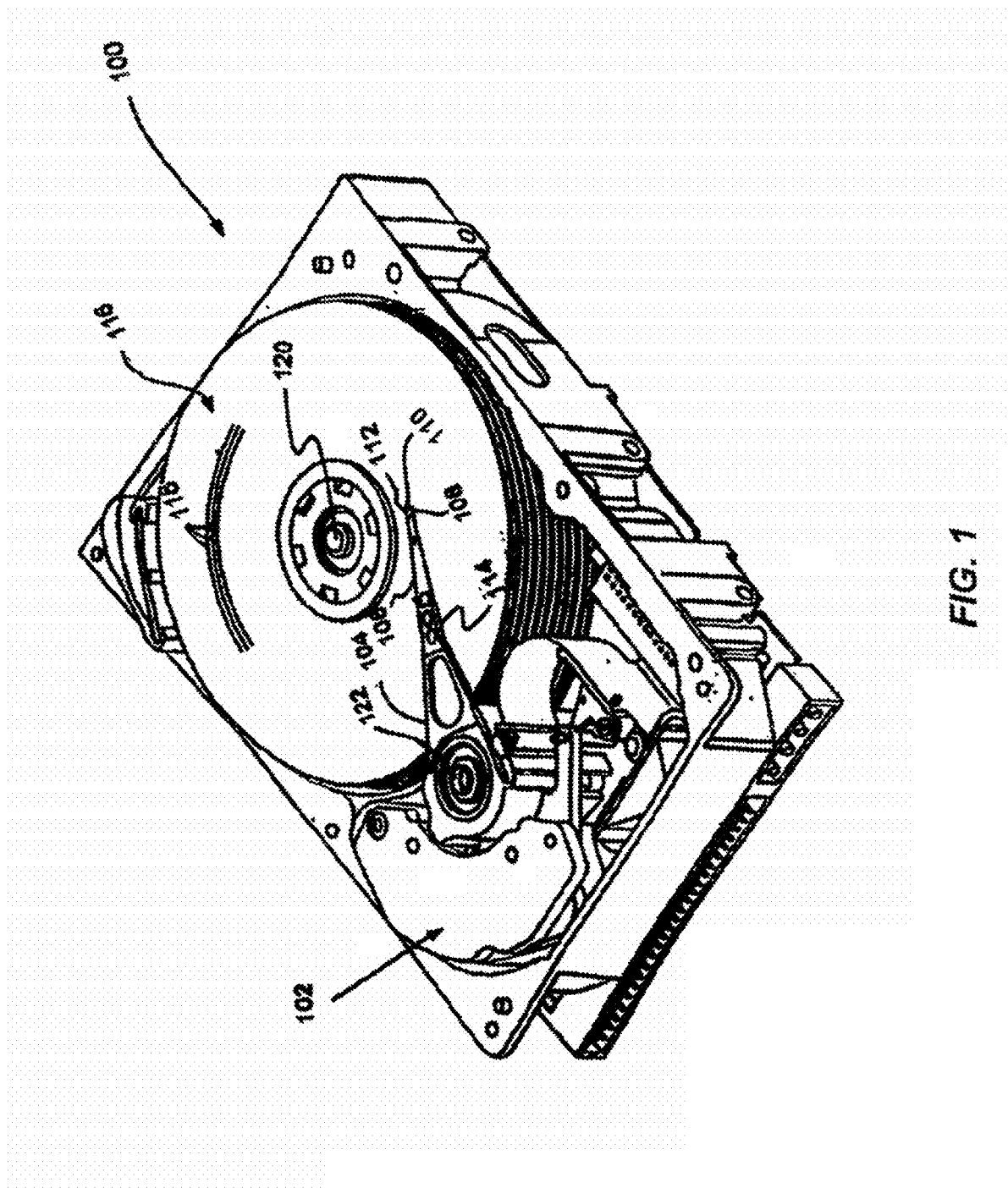
FIG. 1 shows a top perspective view of a disc drive 100 is shown in accordance with an embodiment of the present invention.

Referring now to FIG. 1, a top perspective view of a disc drive 100 is shown in accordance with an embodiment of the present invention. The disc 100 is shown to include a voice coil motor (VCM) 102, an actuator arm 104, a suspension 106, a flexure 108, a slider 110, a read-write (perpendicular) head 112, a head mounting block 114, and disc or media 116. Suspension 106 is connected to the actuator arm 104 at the head mounting block 114. The actuator arm 104 is coupled to the VCM 102. The disc 116 includes a plurality of tracks 118 and rotates about axis 120. The tracks 118 are circular, each extending circularly around the surface of the disc 116 for storing magnetically-encoded data or information using the perpendicular head 112, which will be discussed in greater detail with respect to further figures.

During operation of the disc drive 100, rotation of the disc 116 generates air movement which is encountered by the slider 110. This air movement acts to keep the slider 110 afloat a small distance above the surface of the disc 116, allowing the slider 110 to fly above the surface of the disc 116. The VCM 102 is selectively operated to move the actuator arm 104 around the axis 120, thereby moving the suspension 106 and positioning the transducing head (not shown), which includes a main pole (not shown), by the slider 110 over the tracks 118 of the disc 116. It is imperative to position the transducing head properly to read and write data from and to the concentric tracks 118.

Figure 2:
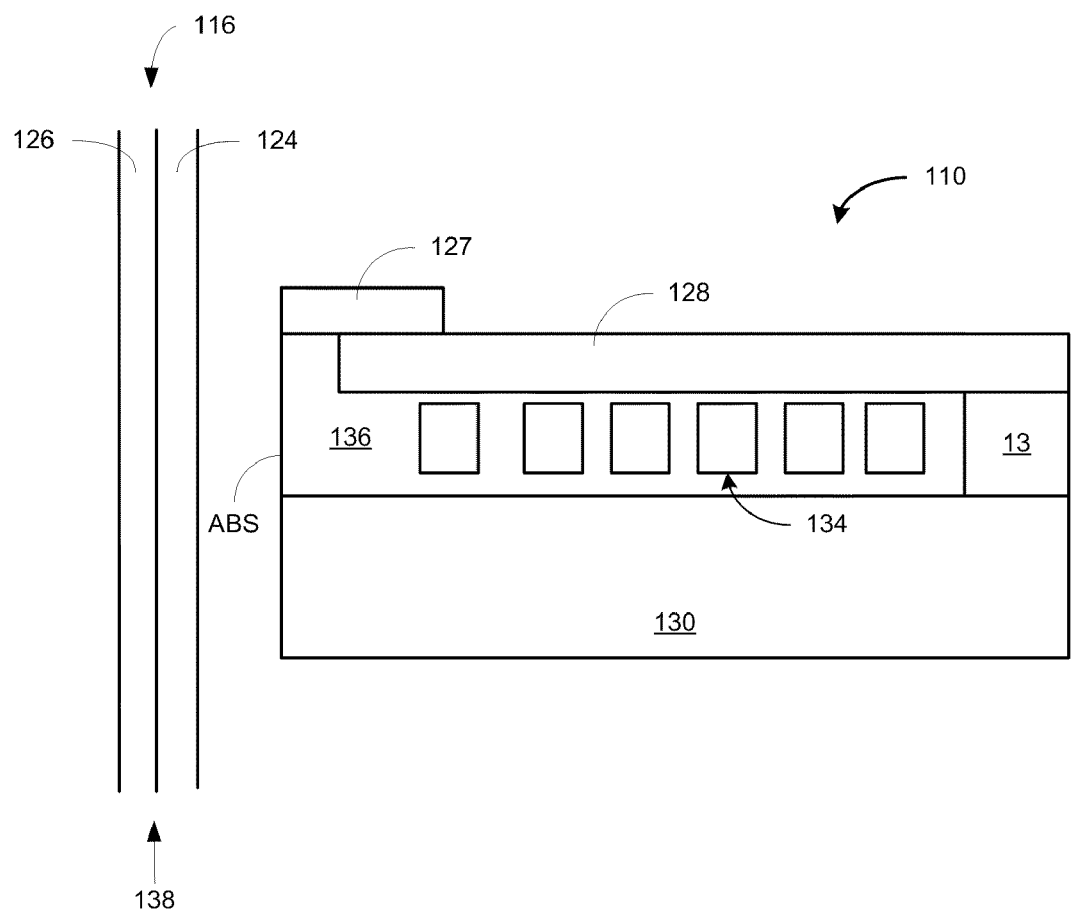
FIG. 2 shows a cross-sectional view of an embodiment of the perpendicular write head 112 in accordance with a embodiment of the present invention.

FIG. 2 shows a cross-sectional view of an embodiment of the perpendicular head (or recorder) 112, which embodies the present invention. The disc (or medium) 116 utilized by perpendicular recorders generally includes a thin storage layer 124 having high coercivity and perpendicular anisotropy (the magnetization is held in a direction substantially normal to the surface of the disc 116) and a soft magnetic underlayer or keeper 126 having high permeability.

The perpendicular recorder (or perpendicular write head) 112 and particularly the slider 110 comprises a main pole 128, a return pole 130, connected to each other by a back gap closure 132 at a distal end and separated from each other by a gap 136 at the ABS and write coil 134 positioned between the main pole 128 and the return pole 130. The main pole 128 extends toward the ABS to form a top pole 127, which is at times referred to as the write pole and whose formation is the subject of the various figures presented herein. It should be noted that structures presented in various figures of the embodiments of the present invention are not shown to scale.

Magnetization directions on the disc 116 are written by the main pole 128. The main pole 128 has 0.15 micron width at the ABS to provide recording of ultra-narrow tracks on the disc 116. Furthermore, the proposed structure of the main pole 128 decreases remnant field in the media as well as coil current for saturation field thereby reducing undesirable data erasures, faster write performance and a reduction in mechanical failures due to the lack of need for high current.

To write data to the perpendicular magnetic disc (or medium) 116, a time-varying write current is caused to flow through the coil 134, which in turn produces a time-varying magnetic field through the main pole 128 and the return pole 130. The disc 116 is then passed by the ABS of the recorder 112 at a predetermined distance such that the disc 116 is exposed to the magnetic field.

A closed magnetic path for flux from the writer 112 to the disc 116 travels from the main pole 128, through the recording layer 124 of the disc 116 to the soft magnetic layer (keeper) 126 and returns to the recorder 112 through the return pole 130, again passing through the storage layer 124. To ensure that the magnetic field does not write data on the return path, while not obvious in FIG. 2, the surface area of the return pole 130 at the ABS is generally substantially larger than the surface area of the main pole 128 at the ABS. Thus, the strength of the magnetic field affecting the storage layer 124 under the return pole 130 will not be sufficient to overcome a nucleation field of the storage layer 124. Prior to further discussion, it should be noted that the illustrations shown in the various figures of this document are not rendered to scale.

The main pole 128 and manufacturing thereof includes the present invention. FIGS. 3-7 show the relevant steps of manufacturing the main pole 128 and the structure, as shown in FIG. 7 of the main pole 128, in accordance with an embodiment of the present invention.

FIGS. 3-9 show the process for manufacturing the main pole 128. In FIG. 3, a structure 200 is shown to be formed, as follows. A laminate layer 212, of high magnetic moment, high Bsat material, is shown onto which a mill mask layer 210 is deposited. The laminate layer 212 is preferably formed as multiple laminated layers of high magnetic moment, high Bsat material such as CoFe separated by very thin layers of nonmagnetic material such as chromium (Cr). The formation of such a material will be familiar to those skilled in the art and may comprise the alternating sputter deposition of layers of non-magnetic and high-Bsat materials.

With continued reference to FIG. 3, a layer of physically hard mill mask layer 210 is deposited, preferably by sputtering. The layer 210 may be, for example, diamond-like carbon (DLC). Thereafter, a first hard mask 208 is deposited onto the layer 210. The first hard mask layer 208 is preferably an NMP-soluble polyimide film, which is sold by Arch Chemicals, Inc. under the trade name DURIMIDE®. A second hard mask 206 is thereafter deposited above the first hard mask 208. The second hard mask could be constructed of, for example, $SiO_2$ or some similar material. In an alternate embodiment, the first hard mask 208 could be constructed of a field filler, such as alumina ($Al_2O_3$) and the second hard mask 206 could be constructed of Ti.

After depositing the second hard mask 206, a third hard mask layer 204 is deposited onto the second hard mask and upon the latter, a layer of photoresist is spun on and patterned using photolithographic procedures familiar to those skilled in the art to produce a photoresist mask layer 202 having a width for defining a trackwidth of the writer. An example of the third hard mask is polyimide. Although examples of materials for the first, second and third hard mask layers 208, 206, 204 have been described, those are only by way of example. More importantly, the second hard mask 206 should be constructed of a material that is more readily removed by a first material removal process (an example of which will be described herein below) than is the photoresist mask layer. In a similar manner, the first hard mask 208 should be selected of a material that will be removed at a faster rate than the second hard mask 206 when subjected to a second material removal process.

Regarding the size of each layer of the structure 200, in one embodiment of the present invention, the photoresist layer 202 is 250 nanometers in thickness, however, it can be anywhere from 100-250 nanometers in thickness. In one embodiment of the present invention, the polyimide layer 204 is 60 nanometers in thickness, however, it can be anywhere from 20-120 nanometers in thickness. In one embodiment of the present invention, the silicon oxide layer 206 is 100 nanometers in thickness, however, it can be anywhere from 50-150 nanometers in thickness. In one embodiment of the present invention, the polyimide layer 208 is 1000 nanometers in thickness, however, it can be anywhere from 500-1500 nanometers in thickness. In one embodiment of the present invention, the DLC layer 210 is 20 nanometers in thickness, however, it can be anywhere from 20-80 nanometers in thickness. In one embodiment of the present invention, the laminate layer 212 is on the order of 250 nanometers in thickness, however, it can be anywhere from 10-300 nanometers in thickness.

In the structure 200, the layer 202 essentially serves as an image resist layer, the layer 204 is a polyimide layer and essentially serves as an ARC (anti-reflective coating layer), the layer 206 is an oxide layer and essentially serves as a hard mask, the layer 208 is another layer of polyimide serving essentially as an underlayer or soft mask, the layer 210 essentially serves as hard mask, and the layer 212 is the main pole material.

A multi-step reactive ion etching (RIE) process is performed to obtain a structure 201 of FIG. 4 from that of the structure 200 of FIG. 3. During such process, the photoresist layer 202 and the polyimide layer 204 are removed by the iterative RIE process.

Next, a reactive fluorine mill, and a multiple-step and multi-angle argon (Ar) milling process are performed to obtain the structure 203 of FIG. 5, which shows the layer 212 to have become beveled, or trapezoidal in shape, to create the beveled laminate main pole 214. Additionally, milling removes the SiO$_2$ layer 206. Moreover, the polyimide layer 208 is reduced in thickness to form the polyimide layer 205. The layer 208 need be thick enough to remain as a milling mask despite the milling process, which will be shortly described shortly. In FIG. 5, the polyimide layer 205 may be 0.8-1.3 microns in thickness and it defines an organic milling mask. Other materials may be optionally used in place of polyimide, such as alumina pattern or any other material that can serve as milling mask.

Ion milling uses ion beam to remove materials. The removal rate and the resulting shape are highly affected by the incidental angle of the ion beam to the surface of the material. Close to vertical angle is used to form vertical shape and a lesser vertical angle to form a bevel shape. The angle ranges from −10 to −70 degree relative to the plane.

In FIG. 5, the top of the pole, or the horizontal dimension, of the layer 210 and the layer 205 defines the track width, i.e. the track width is shown at 221. Building of the structure 203 is described in greater detail in U.S. patent application Ser. No. 10/836,867, filed on Apr. 30th, 2004 and entitled "High Milling Resistance Write Pole Fabrication for Perpendicular Recording", filed by Quang Le et al., the contents of which are herein incorporated by reference as though set forth in full.

Figure 6:
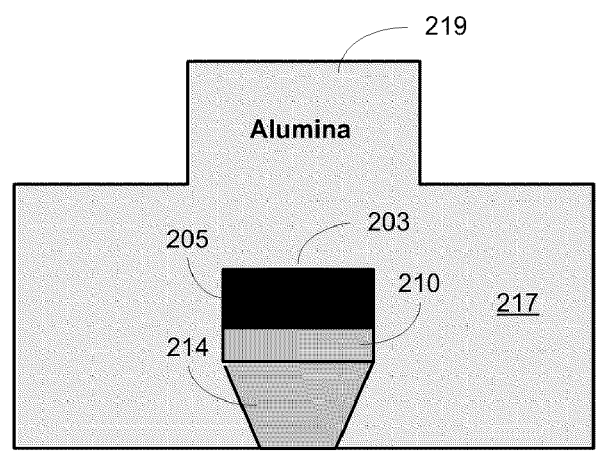
Figure 7:
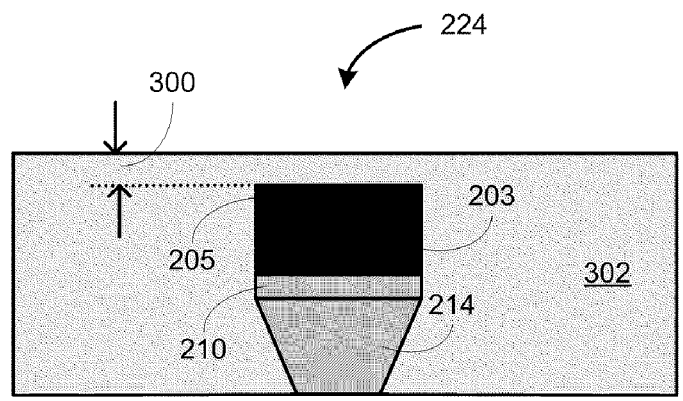

Thereafter, as shown in FIG. 6, an alumina overcoating layer 217 is deposited onto the structure 203 of FIG. 5 to translate the topography of the latter upward. Alumina is basically Al$_2$O$_3$. The reason for the presence of an elevated topography (structure) 219 within a field filler, such as alumina layer 217 is the presence of the structure 203 during deposition. That is, because alumina is deposited everywhere, where there is an elevated structure, such as the structure 203, alumina is deposited over the elevated structure thereby causing a raised or elevated shape, such as the structure 219.

The alumina layer 217 serves to encapsulate and protect the main pole 214 and it need be at least as thick as the combined thickness of the main pole 214 and the polyimide layer 205, plus additional coverage to accommodate for wafer chemical milling polishing process variations. In one embodiment of the present invention, the thickness of the layer 217 is in the range 1.5-2 microns.

Next, a CMP process 224 is performed to polish, flat, the alumina layer 217 including the structure 219, the result of which is shown in FIG. 7. That is, the CMP process 224 planarizes the alumina layer 217 to obtain a flat surface therefor. The alumina layer 217 is reduced to the alumina layer 302 and its reduction leaves alumina on top of the structure 203 just enough to avoid polishing into the polyimide layer 205. In one embodiment, the thickness of the alumina layer 302 that is above the structure 203 is shown at 300, in FIG. 7, and it is 0.5 microns although, in another embodiment, other thickness may be attained so long as polishing through the polyimide layer 205 is avoided.

Figure 8:
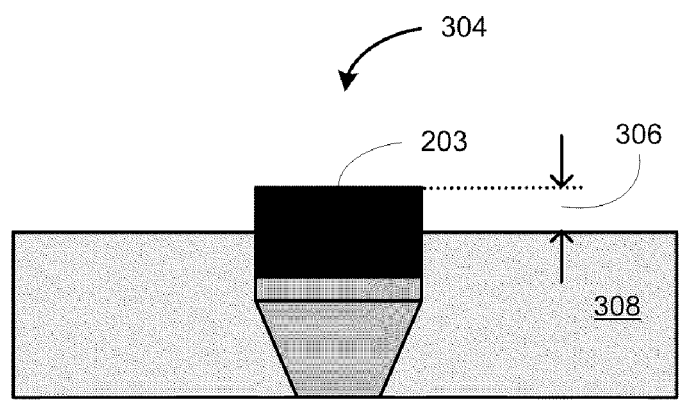

Next, as shown in FIG. 8, a reactive ion milling process 304 is performed milling the alumina layer 302 to the layer 308 to expose the remaining mill mask, or layer 205, typically within 200 nanometers of the top of the structure 203. That is, the exposed portion 306 of the layer 302 is typically 200 nanometers in thickness although other thicknesses may be achieved. During the process 304, the alumina layer 302 is milled as well to form the alumina layer 308. Reactive ion milling mills alumina quickly while allowing greater uniformity and tighter control on the final thickness of the alumina layer 308 relative to the top of the structure 203 than do CMP techniques.

Figure 9:
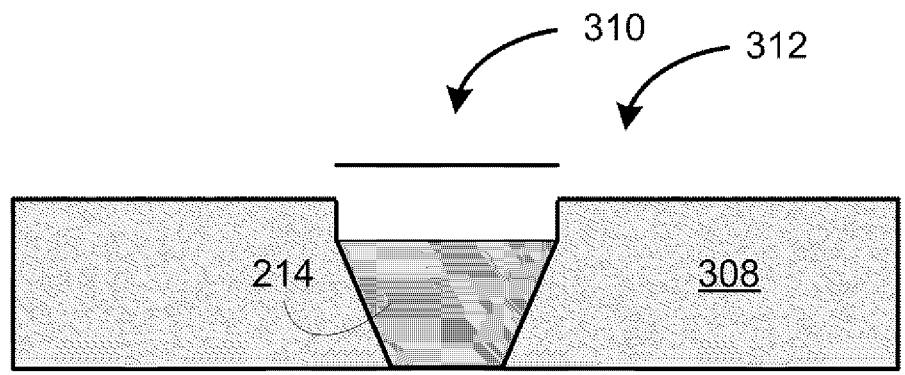

Next, a reactive ion etching (RIE) process 310 is performed, in an oxygen-based gas, to remove the layers 205 and 210, creating the main pole structure 312, having a planarized or flat surface atop the main pole 214, yet, being encapsulated by alumina all around with the alumina on either side of the main pole 214 forming a void notch into which, in one example, a trailing shield is deposited, as shown in FIG. 9. Thus, the main pole is well encapsulated and the surface thereof is planar. The alumina layer 308 remains and appears on either side of and around the main pole but on the top surface thereof, on either side of the main pole, the alumina appears as a step. The steps on either side of the main pole are no more than 200 nanometers above the main pole 214.

If, as a result of the removal of the polyimide layer 205, any fences remain, they will be held in place by the alumina layer 308. The reactive ion milling process 304 of FIG. 8 is performed in a CHF$_3$ or other flourine-based chemistries, whereas the process 310 of FIG. 9 is performed in an O$_2$-based chemistry. Flourine-based chemistry is used to mill the alumina layer during the reactive ion milling process 304 of FIG. 8 because alumina is removed roughly 10 times faster than other metal when flourine is used, whereas, without flourine, alumina is removed at a rate roughly 3 times slower than other metal. The RIE process 310 does not mill any of the alumina layer 308, which is important in ensuring that the main pole 214 is not milled so as to avoid track width definition. The alumina layer 308 does not burn off or get removed because it is not organic.

In an alternative embodiment, the process 310 is performed during the process 304, however, the milling during the process 304 then need be performed in O$_2$-based chemistry to avoid milling through the main pole 214. There is a flat surface formed at the top of the main pole 214 and the top of the layer 308, which is important in planarizing the surface of the main pole for formation of trailing shield thereupon.

It should be noted that figures presented herein are not drawn to scale and do not reflect the true relative or absolute sizes of structures shown therein. Furthermore, where geometry of structures show sharp edges or corners, such as in rectangular, square or angular shapes, such shapes are not necessarily so defined and actually are typically curved.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of manufacturing a perpendicular write head comprising:
    forming a mill mask upon a laminate layer;
    depositing a first hark mask upon the mill mask;
    depositing a second hard mask upon the first hard mask;
    depositing a third hard mask upon the second hard mask;
    depositing a photoresist layer upon the third hard mask;
    removing the photoresist layer and the third hard mask;
    removing the second hard mask;
    milling the mill mask and the first hard mask to form a beveled main pole;
    depositing alumina on top of and around the beveled main pole to encapsulate the beveled main pole;
    polishing the deposited alumina to a level above the mill mask;
    milling the polished alumina to expose a portion of the mill mask; and
    removing the first hard mask and the mill mask.

2. The method of manufacturing a perpendicular write head, as recited in claim 1, wherein the mill mask is made of a diamond-like carbon layer or an $Al_2O_3$ layer.

3. The method of manufacturing a perpendicular write head, as recited in claim 1, wherein a thickness of the mill mask is within a range 10-80 nanometers.

4. The method of manufacturing a perpendicular write head, as recited in claim 1, wherein the first hard mask is made of a polyimide layer.

5. The method of manufacturing a perpendicular write head, as recited in claim 1, wherein a thickness of the first hard mask is within a range 500-1500 nanometers.

6. The A method of manufacturing a perpendicular write head, as recited in claim 1, wherein the second hard mask is made of a $SiO_2$ layer.

7. The method of manufacturing a perpendicular write head, as recited in claim 1, wherein a thickness of the second hard mask is within a range 50-150 nanometers.

8. The method of manufacturing a perpendicular write head, as recited in claim 1, wherein the third hard mask is made of a polyimide layer.

9. The A method of manufacturing a perpendicular write head, as recited in claim 1, wherein a thickness of the third hard mask is within a range 20-120 nanometers.

10. The method of manufacturing a perpendicular write head, as recited in claim 1, wherein a thickness of the photoresist layer is within a range 100-250 nanometers.

11. The method of manufacturing a perpendicular write head, as recited in claim 1, further comprising a step of reactive ion milling to remove the photoresist layer and the third hard mask.

12. The method of manufacturing a perpendicular write head, as recited in claim 1, further comprising a step of milling to remove the second hard mask.

13. The method of manufacturing a perpendicular write head, as recited in claim 1, wherein the deposited alumina is within range 1.5-2 microns.

14. The method of manufacturing a perpendicular write head, as recited in claim 1, wherein the polishing step includes chemical mechanical polishing.

15. The method of manufacturing a perpendicular write head, as recited in claim 1, wherein the milling the polished alumina step includes reactive ion milling.

16. The method of manufacturing a perpendicular write head, as recited in claim 15, wherein the reactive ion milling is performed in a flourine-based chemisty.

17. The method of manufacturing a perpendicular write head, as recited in claim 1, wherein the removing the first hard mask step includes reactive ion etching.

18. The method of manufacturing a perpendicular write head, as recited in claim 17, wherein the reactive ion etching is performed in an $O_2$-based chemistry.

19. The method of manufacturing a perpendicular write head, as recited in claim 1, wherein after the alumina is deposited, the alumina that is on top of the beveled main pole is thicker than the alumina that is on either side of the beveled main pole.

* * * * *